UNITED STATES PATENT OFFICE.

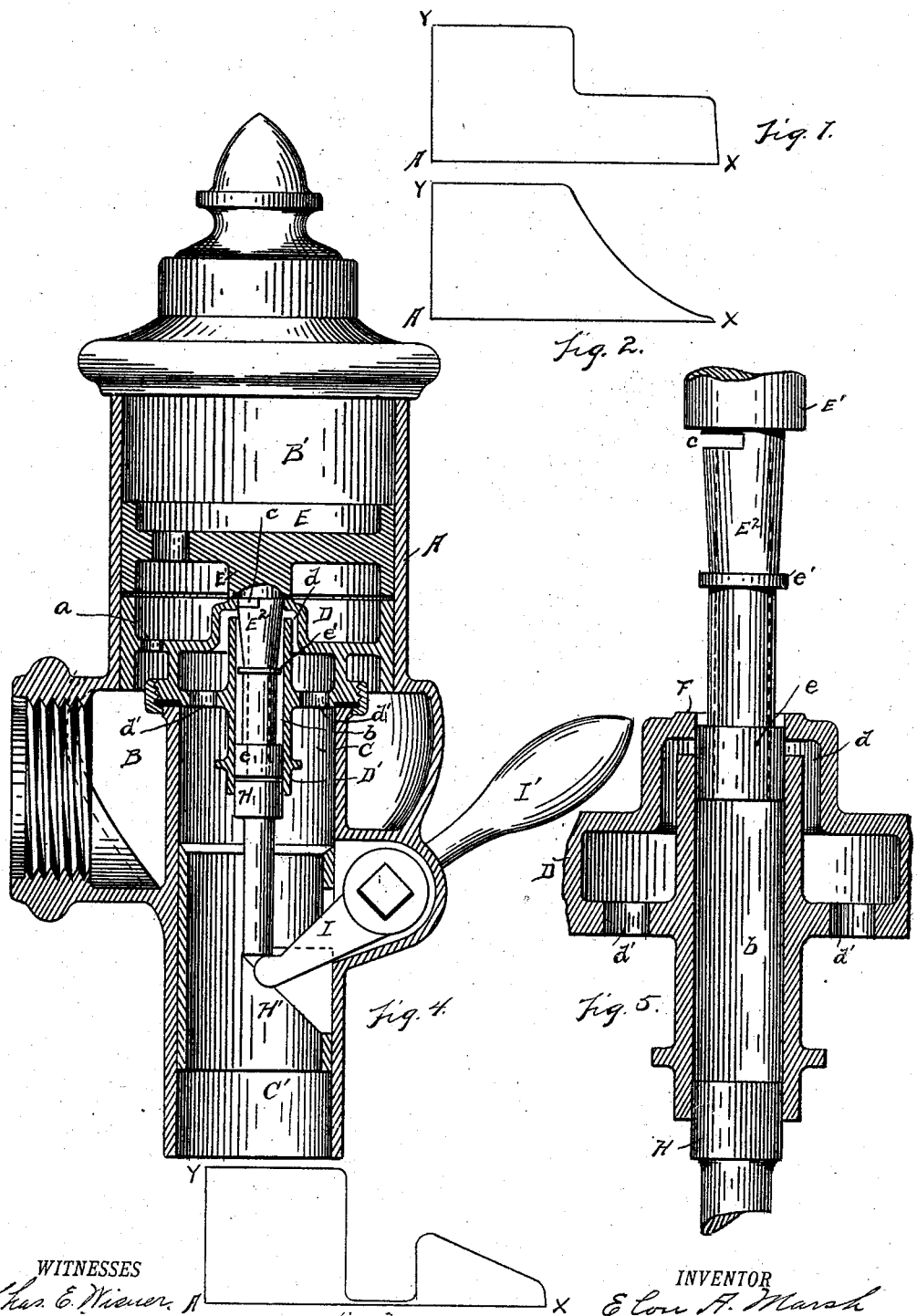

ELON A. MARSH, OF DETROIT, MICHIGAN.

FLUSH-VALVE.

SPECIFICATION forming part of Letters Patent No. 717,236, dated December 30, 1902.

Application filed September 19, 1900. Serial No. 30,462. (No model.)

*To all whom it may concern:*

Be it known that I, ELON A. MARSH, a citizen of the United States, residing at Detroit, county of Wayne, State of Michigan, have invented a certain new and useful Improvement in Flush-Valves; and I declare the following to be a full, clear, and exact description of the invention, such as will enable others skilled in the art to which it pertains to make and use the same, reference being had to the accompanying drawings, which form a part of this specification.

This invention relates to flush-valves, and has for its object an improved valve adapted to produce an intermittent flow of water and to furnish, in the first instance, a supply of water sufficient to siphon and empty the bowl of a closet, and, second, to furnish an ample refill which shall remain in the bowl.

In a patent previously granted to me, No. 665,247, of January 1, 1901, I have shown and described a construction in which the main valve is automatically actuated by shifting pressures induced by the movement of the relief-valve, and in this case the relief-valve is connected to and its closing movement is controlled by a piston, called a "timing-piston." In my said patent there is shown a piston-valve which leaves its seat and rises to a position where it is balanced. In connection with the piston-valve is shown a timing-piston the stem of which reaches through the piston-valve and constitutes a relief-valve. It also constitutes a pressure variant, because of the shape of the stem, the shape of the orifice through which it is projected, and the shape of various adjoining parts of the device, which after a definite movement of the timing-piston disturbs the balance of the main valve and causes it to close toward its seat and finally become seated. The structure shown in said patent is one in which there is, first of all, a manual opening of the relief or pilot valve orifice, after which the main valve opens automatically to its full capacity and to a position in which it is balanced, where it remains until the timing-valve falls and disturbs the balance, brings about an excess of pressure, tending to close the main valve, and finally causes the main valve to close on its seat. Aside from those structures in which the primary fill of the subsequent refill are brought about by the use of either a double-acting valve actuated by compound levers or by a double system of piping and a valve which is arranged to open consecutively the orifice in the one pipe after another, the common method hitherto adopted to secure what is termed a "refill" has been either to reduce suddenly or to reduce gradually the flow of water through the valve, and for the purpose of comparing such methods with the one set forth in the following specification I have represented graphically in Diagrams 1 and 2 the action of the flow of water according to methods heretofore used. In these Diagrams 1 and 2 the length along the line A X represents the duration of the flush and the refill and the height along the line A T represents the volume of water discharged during the operation.

In Diagram 1 is shown a sudden reduction in the volume to provide for a refill, and if the volume of water following is sufficient for a complete refill it is liable to trail after the initial flush and leave the bowl empty or nearly empty, or if the volume be reduced to prevent trailing there will not be as much water left in the bowl as there should be.

In Diagram No. 2 a gradual reduction of flow is shown. A condition results even worse than that shown in Diagram 1. In either case good results may sometimes be obtained under favorable conditions; but flush-valves connected directly to the main must be capable of adjustment, (the adjustment may be either automatic or manual,) and although provision is usually made for adjustment of the initial flush the refill-orifice is fixed and the refill is liable to be variable, depending upon variations of flow in the main, and especially on variations of pressure.

By the invention hereinafter described the difficulties of trailing are avoided and a sufficient and reliable refill is obtained after each flush. The result is indicated graphically by Diagram No. 3, which shows the features of flow and duration, but differs from the Diagrams 1 and 2 in that it shows a period of cessation or substantial cessation between the flush and the refill, which endures for a time sufficient to allow for a cessation of those forces which tend to produce the discharge of the refill.

In the drawings, Figures 1, 2, and 3 are the diagrams already briefly described. Fig. 4 shows that portion of the valve which contains the invention. Fig. 5 is a view, on a larger scale, of a portion of the valve and valve-stem shown in Fig. 4.

A indicates the valve-casing.

B indicates the high-pressure chamber; B', the intermediate pressure-chamber.

C indicates the low-pressure chamber, and C' the outlet or discharge passage beyond the low pressure.

D indicates a piston-valve operating in the chamber B', and E indicates a timing-piston which also operates in the chamber B'.

D' indicates a hollow stem hanging from the piston-valve D, and $E^2$ is a hollow stem hanging from the timing-piston E.

H indicates a plunger, and H' is a guide-ring in which the plunger H is mounted.

I indicates the inside arm of a lever attached to a pin mounted in the valve-casing, and I' is the outside arm of a lever attached to the same pin.

$e$ and $e'$ indicate enlargements of the stem $E^2$, and E' indicates the hub of the timing-piston E.

$c$ is an opening which furnishes a communicating passage between the hollow interior of the stem $E^2$ and the exterior thereof.

$a$ indicates a passage through the web of the piston D, and this passage leads from the high-pressure chamber B to the intermediate-pressure chamber B'.

$b$ is a cylindrical chamber in the hanging stem D' and in the piston D.

$d$ is an annular passage between the piston D and the stem $E^2$. The orificial capacity of this passage is variable and is varied by the vertical reciprocation of the stem $E^2$, which stem has at its bottom end a collar or enlargement $e$, and midway from top to bottom or between the top and the bottom it is provided with a second collar $e'$, and above the collar $e'$ the stem $E^2$ expands conically to the top.

$d'$ $d'$ are passages leading into the low-pressure chamber C, and they constitute, with the passage $d$, a passage which leads from the intermediate chamber to the low-pressure chamber.

When the parts are all in the position shown in Fig. 4, the valve is closed and no water will flow through it. There is in this condition no pressure in the low-pressure chamber, because there is no water in it. The pressure in the high-pressure chamber is equal to that in the intermediate-pressure chamber; but the valve remains closed, because there is an overbalance on the larger face exposed in the intermediate-pressure chamber, which tends to keep the valve closed.

To start the valve in operation, it is necessary to press the lever I' down. The arm I of this lever rises and lifts the plunger H and the timing-piston E with its stem $E^2$. This opens the orifices $d$ and $c$, reduces pressure in the intermediate chamber B', and changes the preponderance of pressure on the main valve from the intermediate chamber to the high-pressure chamber, and the main valve opens and the water begins to flow directly from the high-pressure chamber to the low-pressure chamber. After the lever I' has been pressed down and released the pressure in the intermediate chamber B', acting on the plunger H, will force down the inclosed end I of the lever, and the timing-piston being no longer supported by the plunger H begins to fall by gravity. The time of its fall is determined by the flow of water through the passage in its web, and during the time of its fall the flush and the refill take place. During the first part of its fall the orifice of the passage $d$ is at maximum and is for a time constant, and the decrease of pressure in the chamber B' thus effected produces a maximum opening of the main valve. As the timing-piston continues to fall eventually the collar $e'$ enters the chamber within the cylinder $b$ and the passage $d$ is closed or nearly closed. There is an immediate increase of pressure in the chamber B' and the main valve is forced to its seat. The timing-piston continues to fall and the collar $e'$ passes the upper edge of the annular orifice of the passage D. The pressure in the chamber B' is again reduced and the main valve is again opened, and there is a secondary flow through the passage from the high-pressure to the low-pressure chamber. The secondary flow produces the refill. The timing-piston continues to fall, and during the latter period of its fall the annular orifice is gradually closed and the pressure in the chamber B' gradually increased and the main valve slowly and noiselessly closed, when the hub E' finally comes to rest on the seat F of the piston D.

The collar $e$ has two functions, first, in those flushometers that are to be started manually by pushing down on the handle I' the collar $e$ forms a bottom closure to the annular chamber in the hanging cylinder $b$ and is one of the components affecting the pressure in the intermediate chamber D, and consequently affecting the balance of the main valve. In those flushometers which are to be actuated by seat action the collar $e$ has the above-mentioned function, and it has also another function. In these latter structures the collar $e$ is made wide and is arranged to be lifted to the position shown in Fig. 5, where it entirely closes the passage $d$, and so long as it is held in that position prevents the action of the main valve; but so soon as the external holding force is removed the timing-piston begins to fall, the passage $d$ opens, and the regular cycle of operations follows.

What I claim is—

1. In a flushing device, the combination of a main-piston valve, a timing-piston, means whereby the pressure on the two sides of the main valve are balanced during the period of flushing, and means actuated by the timing-piston to disturb the balance of the main valve, and first close, then open and again close the main valve, whereby there is produced a flush, a cessation of flow, and a second refill flow, substantially as described.

2. In a flushing device, the combination of a main piston-valve, having an opening through the web thereof, a timing-piston, a stem to said timing-piston provided with sections of less diameter than the diameter of the opening through the web, and with a collar of a diameter to fill said opening, dividing said sections, whereby provision is made for periods of flow with an intervening cessation of flow through said opening, substantially as described.

3. In a flushing device, the combination of a casing, a piston-valve therein provided with an opening for the stem of a timing-piston, a chamber above the piston-valve and a passage from the inlet to the chamber above the piston thereof, a passage below the piston-valve between the inlet and the outlet, closed when the valve is seated, a timing-piston in the chamber above the valve, a stem to said timing-piston having sections of less diameter than the opening, and collars terminating said sections, and adapted to substantially close said opening, substantially as described.

4. In a flushing device, the combination of a main-piston valve having an opening through the web thereof, a timing-piston, a stem to said timing-piston provided with sections of less diameter than the diameter of the opening through the web and with a collar of a diameter to fill said opening dividing said sections, with a collar below the lower section of a diameter to fill said opening, substantially as described.

5. In a flushing device, the combination of a main-piston valve having an opening through the web thereof, a timing-piston, a stem to said timing-piston provided with a section of less diameter than the diameter of the opening through the web, and with a collar below said section of a diameter to fill said opening, substantially as described.

6. In a flushing device, the combination of a main-piston valve, having an opening through the web thereof, a timing-piston, a hollow stem to said timing-piston inserted through the said opening in the web of the main-piston valve and provided with inlet and outlet openings, and provided with sections of less diameter than the diameter of the opening through the web, and with a collar of a diameter to fill said opening, dividing said sections, whereby provision is made for periods of flow with an intervening cessation of flow through said opening, and means for independently actuating the piston and main valve, substantially as described.

7. In a flushing device, the combination of a casing, a piston-valve therein provided with an opening for the stem, of a timing-piston, a chamber above the piston-valve and a passage from the inlet to the chamber above the main piston, a passage below the piston-valve between the inlet and the outlet, closed when the valve is seated, a timing-piston in the chamber above the valve, a hollow stem to said timing-piston inserted through said opening in the piston-valve provided with inlet and outlet openings, and having sections of less diameter than the opening, and collars terminating said sections, and adapted to substantially close said opening, and means for independently actuating the valve and timing-piston, substantially as described.

8. In a flushing device, the combination of a main-piston valve having an opening through the web thereof, a timing-piston, a hollow stem to said timing-piston inserted through the opening in the web of the main-piston valve and provided with inlet and outlet openings, and provided with sections of less diameter than the diameter of the opening through the web, and with a collar of a diameter to fill said opening dividing said sections, and with a collar below the lower section of a diameter to fill said opening, substantially as described.

9. In a flushing device, the combination of a main-piston valve having an opening through the web thereof, a timing-piston, a hollow stem to said timing-piston inserted through the opening in the web of the main-piston valve and provided with inlet and outlet openings, and provided with a section of less diameter than the diameter of the opening through the web, and with a collar below said section of a diameter to fill said opening, and means for independently actuating the valve and timing-piston, substantially as described.

In testimony whereof I sign this specification in the presence of two witnesses.

ELON A. MARSH.

Witnesses:
CHARLES F. BURTON,
ELLIOTT J. STODDARD.